United States Patent [19]

Maier

[11] Patent Number: 4,639,171

[45] Date of Patent: Jan. 27, 1987

[54] DOWEL HOLE DRILLING MACHINE

[75] Inventor: Johann Maier, Wolfratshausen, Fed. Rep. of Germany

[73] Assignee: Schleicher Maschinenbau und -Vertrieb GmbH, Geretsried, Fed. Rep. of Germany

[21] Appl. No.: 706,497

[22] Filed: Feb. 28, 1985

[30] Foreign Application Priority Data

Mar. 9, 1984 [DE] Fed. Rep. of Germany ....... 8407334

[51] Int. Cl.$^4$ ............................................. B23B 41/00
[52] U.S. Cl. ..................................... 408/89; 408/103; 408/236
[58] Field of Search ...................... 408/236, 52, 53, 88, 408/89, 103, 241 S, 237, 110, 112

[56] References Cited

U.S. PATENT DOCUMENTS

| 22,085 | 11/1858 | McNair | 408/236 |
|---|---|---|---|
| 253,913 | 2/1882 | Davis | 408/88 |
| 2,417,247 | 3/1947 | Fuller | 408/236 |
| 2,748,627 | 6/1956 | Goldschmidt | 408/88 |
| 4,174,917 | 11/1979 | Brower | 408/20 |

Primary Examiner—Gil Weidenfeld
Assistant Examiner—Daniel W. Howell
Attorney, Agent, or Firm—Peter K. Kontler

[57] ABSTRACT

The dowel hole drilling machine comprises a workpiece support. One part of the workpiece support and a crosspiece carrying the drilling unit are mounted to be pivotally movable in unison about an axis. That workpiece support comprises eccentrically mounted supports, which are adapted to be aligned and flush with the workpiece support and to protrude beyond a workpiece support, which extends at right angles to the workpiece support and is spaced the same distance from the pivotal axis as the workpiece support. The workpiece support serves to support the workpiece during a horizontal drilling operation. When the drilling unit is in a vertical position, the stops are flush with the workpiece support and serve as stops for the drilling of the first row of dowel holes. This results in an exact coordination of the drill and the workpiece support, which constitutes a stop for and defines the location of the reference edge during the horizontal and vertical drilling operations. That coordination will not be changed by the pivotal movement of the drilling unit.

6 Claims, 4 Drawing Figures

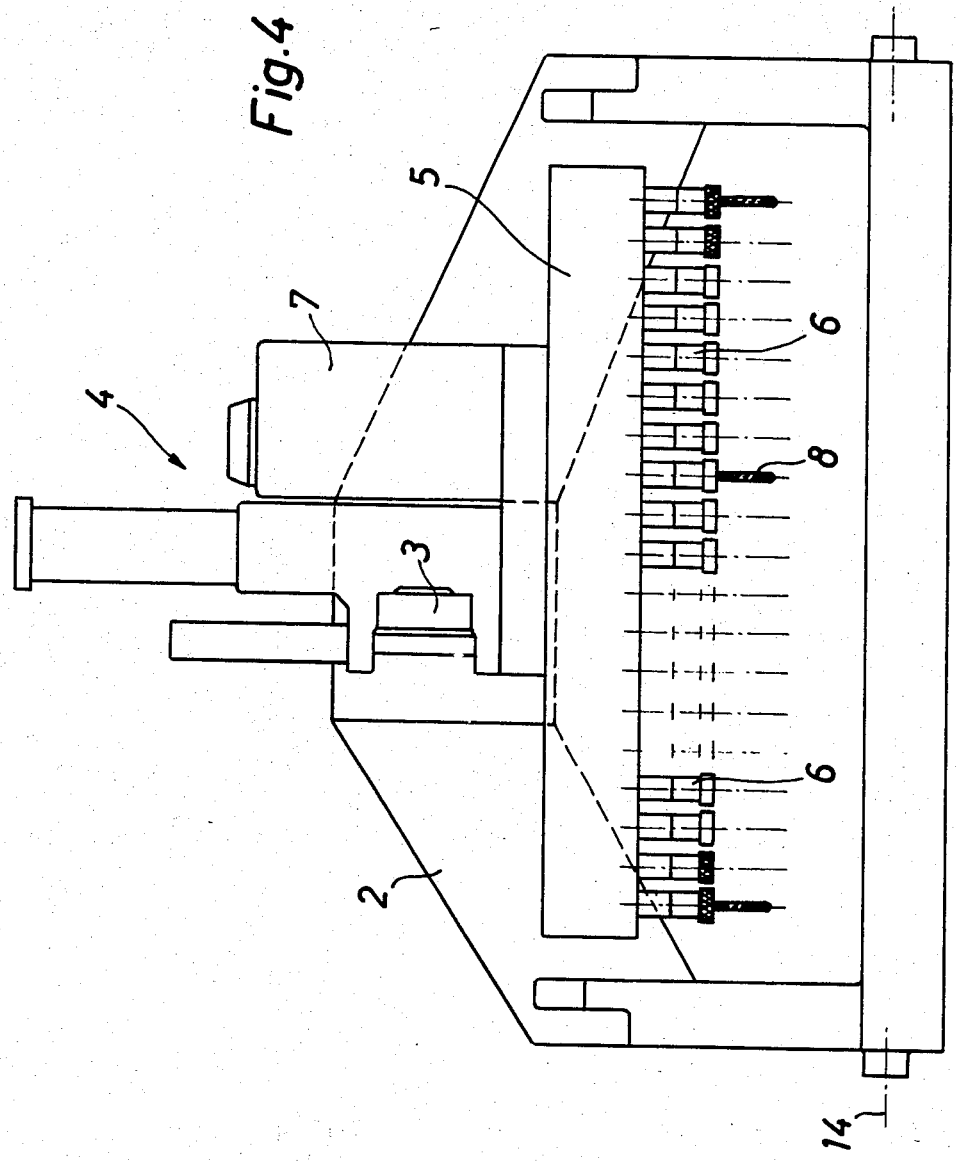

DOWEL HOLE DRILLING MACHINE

BACKGROUND OF THE INVENTION

1. Field of the Invention

This invention relates to a dowel hole drilling machine comprising a workpiece support, stops which are engageable by the workpiece and at least one drilling unit, which is mounted on an angled crosspiece and together with the latter is pivoted on an axis.

2. Description of the Prior Art

In a known dowel hole drilling machine of that kind (Swiss Patent Specification 148,554), the workpiece support consists of an unmovable supporting table, on which the workpiece is movable into engagement with stops. When structural bores for making corner joints are to be drilled, dowel holes must be drilled into the workpiece from its broadside with the drilling unit in a vertical orientation. Dowel holes must be drilled into the other workpiece from its end face with the drilling unit in a horizontal orientation. The accuracy of said drilling operations depends on the exact coordination of the pivotal axis with the workpiece support and the stops. For instance, if the pivotal axis of the crosspiece carrying the drilling unit is not exactly at right angles to the direction in which the workpiece is advanced, the bores will have a smaller distance from the reference edge on one side of the workpiece than on the opposite side. That fault will have serious consequences because the associated workpiece is drilled with the same drilling unit but in a different plane when said unit has been pivotally moved so that the dowels fitted into the bores in one workpiece will not fit the bores in the associated workpiece when the associated edges of the two workpieces are required to exactly contact each other.

SUMMARY OF THE INVENTION

It is an object of the invention so to design a dowel hole drilling machine of the kind described first hereinbefore that the bores will be in perfect register with each other whereas the machine should be simple in structure.

In a dowel hole drilling machine comprising a workpiece support, stops which are engageable by the workpiece and at least one drilling unit, which is mounted on an angled crosspiece and together with the latter is pivoted on an axis that object is accomplished in accordance with the invention in that the workpiece support is divided and that part of the workpiece support which adjoins the pivotal axis is firmly connected to the crosspiece and pivotally movable in unison with the latter. That concept will result in a definite coordination of the drill and the workpiece support and the latter will also provide the stop and define the location of the reference edge during the horizontal and vertical drilling operations without a change even after a pivotal movement of the drilling unit because the distance from the drill to the bearing plane of the support will necessarily remain constant as that bearing plane is pivotally moved with the drill because said plane is firmly connected to the holder for the drilling unit, i.e., to the crosspiece. If a structural bore is formed in a workpiece from its end face by means of a horizontally extending drill, the distance from the axis of that bore to the reference edge of the workpiece will be equal to the distance from the axis of the drill to the bearing plane because the reference edge or reference plane of the workpiece lies on the workpiece support and the latter constitutes the stop for the reference plane of the workpiece. When the drilling unit is then pivotally moved to a vertical position so that it can be used to drill an associated structural bore into the broadside of a workpiece, the distance from the axis of that bore to the reference edge at the end face of the workpiece will again equal the distance from the axis of the drill to the bearing surface because the bearing surface which has been pivotally moved with the drill now serves as surface or stop for engagement by the reference edge at the end face of the second workpiece into which the associated structural bore is to be drilled. When the two workpieces are now joined by means of a dowel, the edges at the corner will not be offset because the locations of the bores in both workpieces relative to the respective reference edges will necessarily be identical as the position of the drill relative to the bearing surface or stops cannot be changed. This is due to the fact that the bearing surface or stop surface is pivotally moved in unison with the drill. Because the bearing plane is definitely coordinated with the drilling unit and is pivotally moved in unison with the latter, any assembling errors or machining tolerances affecting, e.g., the alignment of the pivotal axis with the direction in which the workpiece is advanced, cannot exert any influence.

A perfect register of the bores will be ensured in a most simple and most reliable manner if the pivoted part of the workpiece support and the crosspiece are integral with each other. In that case the holder for the drilling unit, the workpiece support and the stop, which in the prior art constitute three separate parts, are integral with each other. That feature of the invention precludes any change of the relative positions of the drill, support and stop surface.

In accordance with a preferred further feature of the invention an additional workpiece support is firmly connected to the crosspiece and extends at right angles to the first pivoted workpiece support and at the same distance from the pivotal axis as the first pivoted workpiece support, stops for use during the vertical drilling operation are provided in the plane of the first pivoted workpiece support as extensions thereof and are adapted to be retracted to or below the plane of the second workpiece support, stops for use during the horizontal drilling operation are provided as an extension of the plane of the second pivoted workpiece support, and said stops are flush with the bearing surface of that workpiece support which is extended by said stops.

That arrangement affords the advantage that after the drilling unit has been pivotally moved to a vertical position the second workpiece support will be disposed during the vertical drilling operation in the same plane in which the first workpiece support was disposed during the horizontal drilling operation. Because the stops are adapted to be retracted and the crosspiece is angled, the workpiece can be advanced through the dowel hole drilling machine so that dowel holes can be drilled not only adjacent to the edges of the workpiece but at any desired location thereof.

In accordance with a further preferred feature of the invention the drilling unit is adjustable in a direction which is transverse to the pivotal axis and transverse to the direction in which the drill is advanced. In that case the distance from the bores to the reference edge can be changed without a change of the stops.

BRIEF DESCRIPTION OF THE DRAWING

The invention is illustrated by way of example in the drawing, in which

FIG. 4 is a front elevation showing the arrangement of FIG. 3.

DETAILED DESCRIPTION OF THE PREFERRED EMBODIMENT

Figure 1:
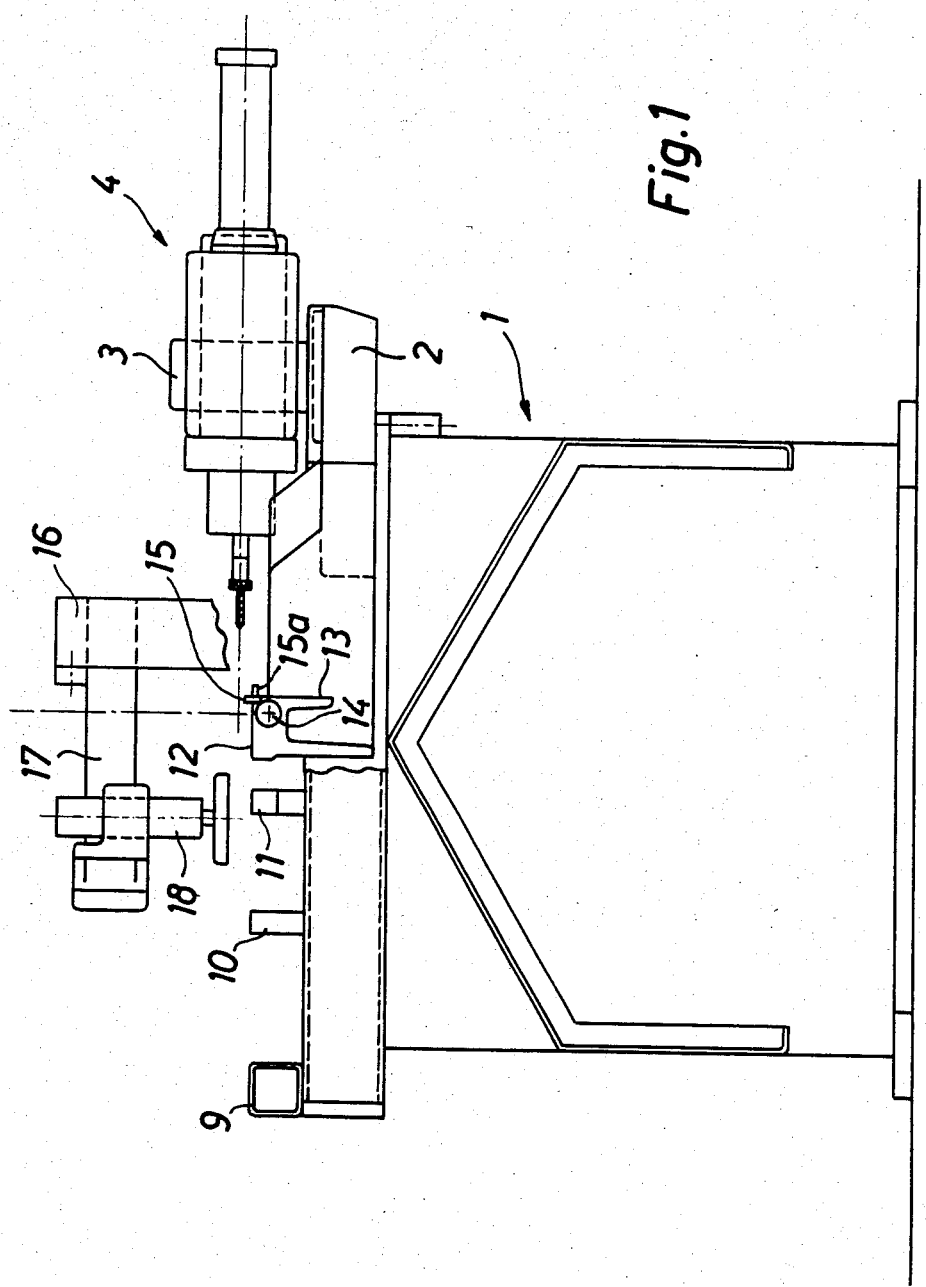
FIG. 1 is a side elevation, partly torn open, and shows a dowel hole drilling machine with the drilling unit in a horizontal position.
Figure 2:
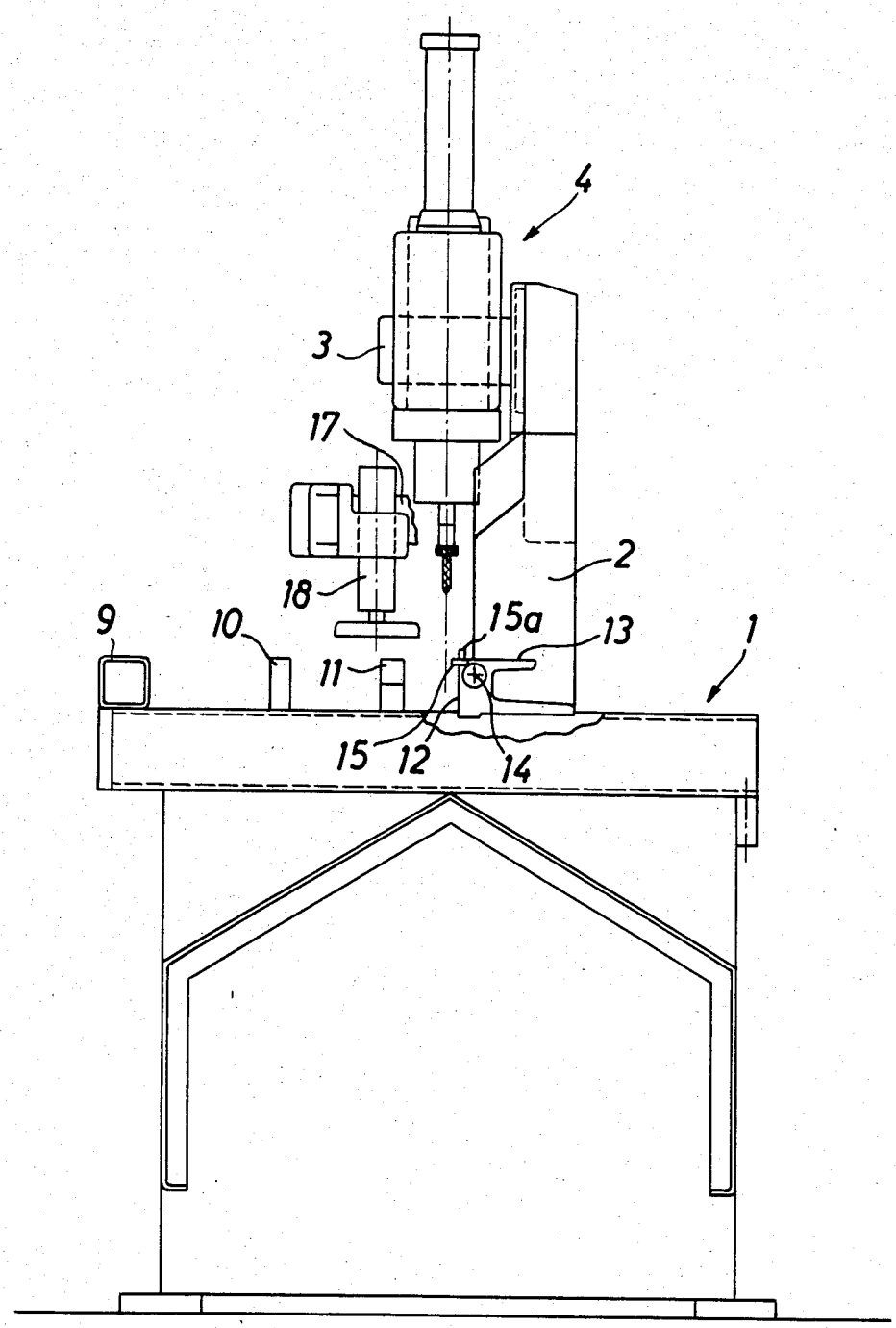
FIG. 2 shows the dowel hole drilling machine of FIG. 1 with the drilling unit in a vertical position.
Figure 3:
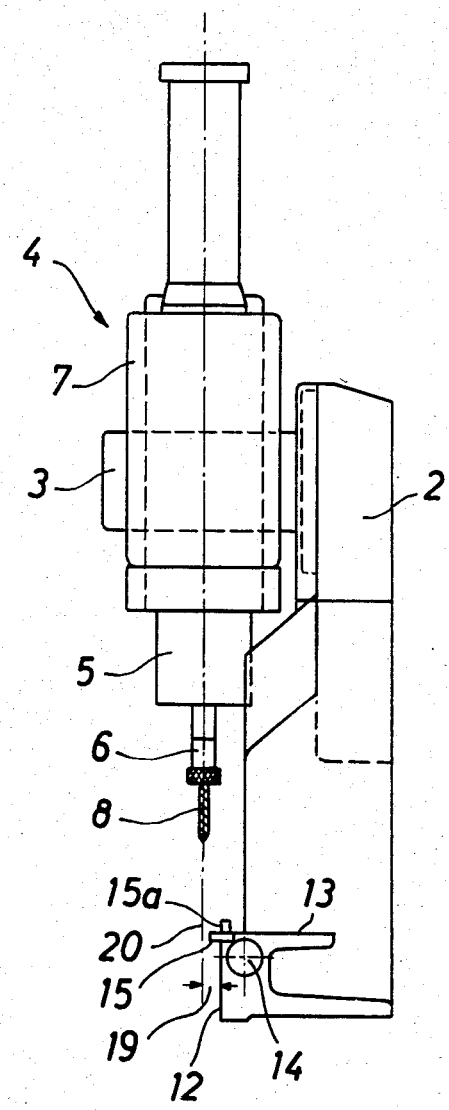
FIG. 3 is a side elevation showing only the drilling unit and the pivoted crosspiece.

An angled crosspiece 2 is pivoted to a base frame of a dowel hole drilling machine. That base frame is generally designated 1. The crosspiece 2 is movable from a horizontal position, shown in FIG. 1, to a vertical position, shown in FIG. 2. That pivoted angled crosspiece 2 has a protruding bracket 3, which carries a drilling unit 4, which includes a drill-carrying beam 5 provided with a plurality of drill chucks 6, all of which are adapted to be driven by a common motor 7. Drills 8 are shown to be fixed in some of the drill chucks.

A workpiece to be drilled is adapted to be supported by a composite workpiece support 9, 10, 11, 12. The parts 9, 10, 11 are fixedly mounted on the base frame 1. The part 12 is integral with the crosspiece 2 and pivotally movable in unison with the latter. A second workpiece support 13 extends at right angles to the workpiece support 12 and is integral with the crosspiece 2 and pivotally movable in unison with the latter about the pivotal axis 14 of the crosspiece 2. The distance from the bearing surface of the workpiece support 13 to the pivotal axis 14 is exactly as large as the distance from the bearing surface of the workpiece support 12 to the pivotal axis 14. This arrangement ensures that when the crosspiece has been pivotally moved to a vertical position the second workpiece support 13 provided on the crosspiece will be disposed in the same plane as the workpiece support 9 to 11 as is the case with the workpiece support 12 when the drilling unit is in a horizontal position. Owing to that design of the workpiece supports which are integral with the crosspiece the workpiece can be advanced through the machine when the drilling unit is in a vertical position so that it is possible to drill dowel holes into the side wall of a cupboard in a plurality of rows at different distances from the reference edge.

A stop 15 consisting, e.g., of a bar, is provided and serves only to prevent an excessive advance of the workpiece as far as to the drills during a horizontal drilling operation.

The workpiece support 12 defines the location of the reference edge for the horizontal drilling operation and is provided with eccentrically mounted, rotatable stops 15a, which are flush with the workpiece support. Owing to their eccentric mounting said stops may constitute extensions of the workpiece support 12 and may protrude beyond the workpiece support 13. In their other angular position the stops 15a are sufficiently retracted relative to the workpiece support 13 so that they do not protrude beyond the latter. When the drilling unit is in a vertical position, the stops 15a protrude above the workpiece support 13 and define the location of the reference edge for the vertical drilling operation. As a result, the same stop edge or stop plane is used for the horizontal and vertical drilling operations because the stops 15a are flush with the workpiece support 12.

A U-shaped bracket 17 is mounted on holders 16. Fixing cylinders 18 for fixing a workpiece to the workpiece support are slidably mounted on the bracket 17 and consist of pneumatic cylinders.

When dowel holes are to be drilled into two workpieces, which are to be joined at their ends to form a corner, one workpiece is first placed on the workpiece supports 9, 10, 11 and 12 with the end face of the workpiece in engagement with the stops 15. The drilling unit 4 in a horizontal position is then used to drill dowel holes into the end face of the workpiece with the drills 8. The distance from the axes of said bores to that outside surface of the workpiece which lies on the workpiece support 12 is exactly equal to the distance 19 from the axis 20 of the drill to the workpiece support 12. When the drilling unit 4 has been pivotally moved to the vertical position, the second workpiece is placed on the workpiece supports 9, 10 and 11 with its end face in engagement with the stops 15a which are aligned with the bearing surface 12. In that position of the parts, the drills 8 are used to drill dowel holes into the broadside of the workpiece and the distance from the axes of said bores to the reference edge, i.e., from the end of the workpiece, will be equal to the distance 19 because the position of the drilling unit 4 relative to the crosspiece has not been changed and the support 12 which is now engaged by the end face of the workpiece is integral with the crosspiece 2. As a result, an exact corner joint will be obtained when the two workpieces are joined by means of dowels. This is due to the fact that the distance from the axes of the bores in the end face of one workpiece to the outside surface thereof is exactly as large as the distance from the axes of the bores in the other workpiece from the end edge thereof as said two distances are equal to the distance 19 from the axis of the drill 20 to the support 12. Because the bearing surface 12 is fixed to the crosspiece 2, the equality of the distances from the respective reference edges is necessarily obtained as the distance from the axis of the drill to the bearing surface cannot be different under either operating condition and the bearing surface 12 on which the workpiece is supported during the horizontal drilling operation is used as a stop surface engaged by the edge of the workpiece during the vertical drilling operation. Said distances must be equal if a satisfactory corner joint is to be obtained. The stops 15a must flush with the bearing surface 12 because the length of the bearing surface 12 in the direction of the axis of the drill is limited by the bearing surface 13. If the bearing surface 12 were extended in length, the bearing surface 12 itself could be used as a stop but in that case the workpiece could not be advanced through the machine. For this reason stops 15a are retractable and are flush with the bearing surface 12 so that the distance 19 can be exactly maintained even when the workpiece engages the retractable stops rather than the bearing surface 12 itself.

I claim:

1. A dowel hole drilling machine, comprising a work support having a first portion and a second portion; a crosspiece, the second portion of said support being provided on said crosspiece; means for pivotally connecting said crosspiece and the second portion of said support to the first portion of said support so that the crosspiece and the second portion of said support are pivotable about a predetermined axis between first and second postions at right angles to each other; at least one drilling unit mounted on and pivotable with said crosspiece between said first and second positions; and first and second stops provided on said crosspiece, a workpiece resting on the first portion of said support being arranged to simultaneously rest on the second portion of said support as well as to abut against one of said stops in one position of said crosspiece, and a workpiece resting on the first portion of said support being arranged to abut against the second portion of said support as well as to abut against the other of said stops in the other position of said crosspiece.

2. The machine of claim 1, further comprising first and second stops provided on said crosspiece, a workpiece resting on the first portion of said support being arranged to simultaneously rest on the second portion of said support as well as to abut against one of said stops in one position of said crosspiece, and a workpiece resting on the first portion of said support being arranged to abut against the second portion of said support as well as to abut against the other of said stops in the other position of said crosspiece.

3. The machine of claim 1, wherein the second portion of said support is integral with said crosspiece.

4. The machine of claim 1, further comprising a second support rigid with said crosspiece and disposed at right angles to said second portion, said second portion and said second support being equidistant from said axis, said first stop being coplanar with said second portion and said second stop being coplanar with said second support.

5. The machine of claim 4, wherein said first stop is retractible into said crosspiece.

6. The machine of claim 5, wherein said drilling unit has a rotary drilling tool whose axis is normal to said predetermined axis, said drilling unit being adjustable with reference to said crosspiece at right angles to said predetermined axis and at right angles to the axis of said tool.

* * * * *